United States Patent
Reardon et al.

(10) Patent No.: US 8,580,019 B2
(45) Date of Patent: Nov. 12, 2013

(54) APPARATUS AND METHOD OF OPTIMIZED ACID GAS AND TOXIC METAL CONTROL IN GASIFIER PRODUCED GASES

(75) Inventors: John P. Reardon, Lake St. Louis, MO (US); Thomas J. Paskach, Ames, IA (US); Paul Evans, Miami, OK (US)

(73) Assignee: Frontline BioEnergy, LLC, Ames, IA (US)

( * ) Notice: Subject to any disclaimer, the term of this patent is extended or adjusted under 35 U.S.C. 154(b) by 187 days.

(21) Appl. No.: 13/107,726

(22) Filed: May 13, 2011

(65) Prior Publication Data

US 2011/0277639 A1    Nov. 17, 2011

Related U.S. Application Data

(60) Provisional application No. 61/395,682, filed on May 14, 2010.

(51) Int. Cl.
    *B01D 53/12* (2006.01)
(52) U.S. Cl.
    USPC ........... 96/150; 48/127.3; 48/127.9; 110/343; 110/345
(58) Field of Classification Search
    USPC .......... 48/127.3, 127.9; 96/150; 110/343, 345
    See application file for complete search history.

(56) References Cited

U.S. PATENT DOCUMENTS

| | | | |
|---|---|---|---|
| 4,649,034 A * | 3/1987 | Rutledge | 423/244.09 |
| 5,346,674 A * | 9/1994 | Weinwurm et al. | 422/168 |
| 5,465,597 A | 11/1995 | Bajraszewski et al. | |
| 5,645,620 A | 7/1997 | Shenke | |
| 2010/0115839 A1 * | 5/2010 | Brown et al. | 48/127.3 |

OTHER PUBLICATIONS

Laboratory Study on the High-temperature Capture of HCI Gas by Dry-injection of Calcium-based Sorbents. Shermwell, Brooke, Levendis, Yiannis A. and Simons, Girard A. s.l. : Chemosphere, 2001, vol. 42, pp. 785-796.

A Thermogravimetric Study of the Reaction of Hydrogen Chloride Gas with Calcined Limestone: Determination of Kinetic Parameters. Daoudi, M. and Walters, J. K. 1991, The Chemical Engineering Journal, vol. 47, pp. 1-9.

Hydrogen Chloride Reaction with Lime and Limestone: Kinetics and Sorption Capacity. Weinell, Claus E., et al. s.l. : Ind. Eng. Chem. Res., 1992, vol. 31, pp. 164-171.

Kinetic Study of Hydrated Lime Reaction with HCI. Yan, Rong, et al. 2003, Environ. Sci. Technol., pp. 2556-2562.

Reaction Mechanism of Calcium Hydroxide with Gaseous Hydrogen Chloride. Allal, K. M., Dolignier, J. C. and Martin, G. 6, s.l. : Revue De L'Institut Francais Du Petrole, 1998, vol. 53, pp. 871-880.

(Continued)

*Primary Examiner* — Christopher P Jones
(74) *Attorney, Agent, or Firm* — Camille L. Urban

(57) ABSTRACT

An apparatus and method is presented for removing acid gases and other trace contaminants to very low levels in combustible gases generated from thermal gasification of biomass or refuse-derived fuels. The invention includes optimization of geometric variables, temperature and pressure set points via use of a pressurized bubbling fluidized bed reactor to convert granular raw (non-activated) sorbents and auto-generated biochar sorbents) into activated, highly dispersed, and ideally sized particles for removing acid gases and toxic metals. The system can incorporate a generated gas cooler, a gas-sorbent contact chamber or zone, and a novel filter (with or without additional gas cooling and residence time stages).

19 Claims, 6 Drawing Sheets

(56) References Cited

OTHER PUBLICATIONS

Determination of Thermodynamical Data of Calcium Hydroxichloride. Allal, K. M., Dolingnier, J. C. and Martin, G. 3, s.l. :Revue De L'Institut Francais Du Petrole, 1997, vol. 52, pp. 361-368.

Reaction Kinetics of Hydrogen Chloride with Calcium Oxide by Fourier Transform Infrared Spectroscopy. Li, Maosheng, Shaw, Henry and Yang, Chen-Lu. s.l. : Ind. Eng. Chem. Res., 2000, vol. 39, pp. 1898-1902.

Reaction Kinetics of Ca-Based Sorbents with HCl. Gullett, Brian K., Jozewicz, Wojciech and Stefanski, Leonard A. s.l. : Ind. Eng. Chem. Res., 1992, vol. 31, pp. 2437-2446.

Prediction of Standard Heats and Gibbs Free Energies of Formation of Solid Inorganic Salts from Group Contributions. Golam Mostafa, A.T.M., Eakman, James M., and Yarbro, Stephen L. s.l. : Ind. Eng. Chem. Res., 1995, vol. 34, pp. 4577-4582.

Prediction of Heat Capacities of Solid Inorganic Salts from Group Contributions. Golam Mostafa, A.T.M., Eakman, James M., Montoya, Mark M., and Yarbro, Stephen L. s.l. : Ind. Eng. Chem. Res., 1996, vol. 35, pp. 343-348.

HCl Formation from RDF Pyrolysis and Combustion in a Spouting-Moving Bed Reactor. Wang, Zhiqi, Huang, Haitao, Li, Haibin, Wu, Chuangzhi, Chen, Yong, and Li, Baoqing. s.l. : Energy and Fuels, 2002, vol. 16, pp. 608-614.

The Apparent Kinetics of H2S Removal by Zinc Oxide in the Presence of Hydrogen. Huiling, Fan, Yanxu, Li, Chunhu, Li, Hanxian, Guo, and Kechang, Xie. Fuel, 2002, vol. 81, pp. 91-96.

The Foster Wheeler Gasification Technology for Biofuels: Refuse-derived Fuel (RDF) Power Generation. Palonen, Juha, Anttikoski, Timo, and Eriksson, Timo. A Foster Wheeler Publication, 2006.

FGD Technology Developments in Europe and North America. Schuettenhelm, Wolfgang, Robinson, Thomas, and Licata, Anthony. Technical Publication of Babcock Borsig Power, Inc., a Babcock Power Inc., Company. Presented at the EPA-DOE-EPRI Mega Symposium, Arlington Heights, Illinois, Aug. 20-24, 2001.

Kinetics of HCl Reactions with Calcium and Sodium Sorbents for IGCC Fuel Gas Cleaning. Kirkby, Seville, Kid, Bos, Uil. Chemical Engineering Science, 1996, vol. 51, No. 11, pp. 2541-2546.

\* cited by examiner

APPARATUS AND METHOD OF OPTIMIZED ACID GAS AND TOXIC METAL CONTROL IN GASIFIER PRODUCED GASES

This application claims the priority of provisional Application Ser. No. 61/395,682 filed May 14, 2010.

BACKGROUND

1. Field of Invention

The present invention relates to processes and apparatus for removal of unwanted substances from thermally produced gases and, more specifically, to the removal of acid gases, hydrogen chloride and hydrogen sulfide gases, and toxic metal vapors such as mercury, and lead, from the same.

2. Description of Prior Art

Renewable opportunity fuels such as lignocellulosic biomass ("biomass") and refuse derived fuels ("RDF") from municipal or industrial waste are important feedstocks for future production of renewable power and synthetic fuels and chemicals. However, some of these fuels (especially rapid growing biomass and RDF) contains chlorine and other contaminants. Chlorine may exist in the ash as an inorganic salt, or may be bound to carbon (in organic form). The combustion or gasification of biomass (including RDF) will contribute to the release of hydrogen chloride (HCl) gas, which is a hazardous air pollutant (HAP) if emitted. Use of refuse derived fuels can also produce vapors of toxic metals if present in the waste feedstock, for example, mercury and lead.

There are also several natural sorbent elements present in biomass ash (including common alkali metals, potassium, and sodium; also common alkali earth metals, calcium, and magnesium; and transition metal oxides, titanium dioxide, zinc oxide) that have affinity for acid gases at certain temperatures—usually less than the gasifier operating temperature—and also for toxic metal capture. Indeed, there are various natural minerals such as dolomite and calcite (limestone) that have rapid kinetics for hydrogen chloride and hydrogen sulfide gas capture if activated—usually by heating—that can be employed, along with the natural biomass ash, to reduce acid gas concentrations in generated gases prior to combustion. Further, studies show the contaminant is more concentrated in the generated gas and therefore if captured to low concentrations (limited by equilibrium and sorption kinetics) in the smaller volume generated gas, then the resulting emission would be lower in net (after combustion) than by post combustion flue gas cleaning alone.

An example acid gas (HCl) capture scheme using calcite (limestone) is as follows:

(Calcite to activated lime)

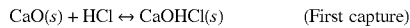
(First capture)

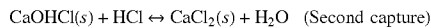
(Second capture)

Overall capture reaction (from oxide phase):

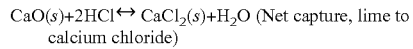
(Net capture, lime to calcium chloride)

The reaction rate for hydrogen chloride capture by calcium oxide (CaO) is reported to be first order with respect to HCl (Li, M, Shaw, H, and Yang, C. L., "Reaction Kinetics of Hydrogen Chloride with Calcium Oxide by Fourier Transform Infrared Spectroscopy." *Ind. Eng. Chem. Res.* (39), 2000: 1898-1902), and rate limited by surface reaction—provided internal mass transfer resistances are negligible (small particles, small grains) and an excess surface area is available. Kinetics for this reaction are reported in the literature (Shemwell, et. al. 2001, Gullet, et. al 1992, Li, et. al, 2000).

Published approaches for removal of chlorides and acid gas include introducing gas to be treated into a non-pressurized (atmospheric pressure) circulating fluidized bed of limestone—a gas treatment device—that contacts the treated gas with a high excess of sorbent, usually in a post combustion flue gas stream. This method operates at relatively lower temperatures and so requires large contact volumes. When operating in post combustion systems, the gas must be reheated to have effective kinetic performance. (*FGD TECHNOLOGY DEVELOPMENTS IN EUROPE AND NORTH AMERICA*, Wolfgang Schuettenhelm, Thomas Robinson, and Anthony Licata, © Babcock Borsig Power, Inc., 2001.)

Also known is the injection of prepared ultra-fine activated powders (dry or wet) into a capture system—which could be the freeboard of either a fluid bed combustor or fluid bed gasifier. Injection of powdered non-activated limestone, dolomite, or slaked lime into the produced gas or flue gas has also been used. However, injecting cold non-activated powders requires additional time for the powder to be warmed to the gas temperature. These other disclosures do not achieve the quality of particle dispersion that might increase the efficiency of the process. (U.S. Pat. No. 5,464,597)

Limestone and dolomite are commonly used as sorbents in atmospheric circulating fluidized bed gasifiers. The circulating fluid bed relies on the sand recovery cyclone efficiency to influence particle slip; therefore, because the cyclone has a fixed geometry it cannot modulate with gas production capacity to effect any benefit for controlling sorbent and bio-char particle size with gas production capacity. Moreover, the atmospheric system cannot modulate any parameter with capacity to maintain ideal superficial velocity for sorbent particle size quality, nor maintain downstream residence time as constant. (Combustion and Gasification in Fluidized Beds, Prabir Basu, (2006, CRC Press, Taylor and Francis Group)

A common approach to the problem of removing unwanted substances such as chloride and acid gas is to inject finely divided (<40 μm) dry powder sorbents into the target gas stream (Shemwell 2001); alternately, a sorbent slurry might be sprayed into the gas with the sorbent in hydrated form (e.g., slaked lime, $Ca(OH)_2(s)$). The kinetics of chloride capture (for example) is benefited by having smaller particles to reduce internal diffusion limitations and improve sorbent utilization.

What is needed is a system that can achieve the removal of chlorides and acid gas while operating in a smaller volume gas stream at higher temperatures with less kinetic limitations. Further, a system that does not require gas reheating would be beneficial. Finally, a system that could be operated to produce particles of sorbent of desirable size and modulate parameters in order to maintain ideal superficial velocity for sorbent particle size quality and to maintain constant downstream residence is highly desirable.

SUMMARY

The objectives of the present invention address optimization of multi-stage temperature parameters to achieve the lowest achievable levels of chloride. The first objective of the method and apparatus of this invention is to achieve lower net HCl concentrations than known post-combustion treatment systems and achieve lower levels than known atmospheric pressure processes on gasifier produced gas streams.

The second objective is, preferably, to employ non-activated granular powders. A granular particle is defined as a particle larger than would be elutriated, but preferably commensurate with a Geldart type B particle. (Geldart n.d.) The third objective of the invention is to use pressure variation to condition the sorbent feed to an ideal particle size during its in situ activation in the fluid bed reactor. This occurs before the sorbent is passed to the downstream stages of cooling and residence time and final filtration. It is a fourth objective that the biochar produced by the present invention functions as an internally generated sorbent with natural minerals. It is pulverized and released in an ideal particle size to help capture acid gases, or prevent the release of the same. It is a fifth objective for the apparatus and method of the present invention to provide for optimum temperature conditioning to arrive at the lowest achievable levels of the pre-combusted gas.

Several embodiments of the present invention can be used with effectiveness. A first embodiment of the apparatus includes a pressurized bubbling fluid bed reactor for conversion of granular sorbent and biomass materials into activated fine powders useful for acid gas capture in the remainder of the system. It further includes a primary heat exchanger to cool sorbent and produced gases at a preferred sorption temperature. A sorbent reaction chamber or zone provides gas and sorbent contact residence time. A secondary gas cooler can be employed if a second sorption temperature is needed. Finally, a filter chamber or zone designed to provide additional gas-sorbent contact residence time completes the general system overview.

Alternate configurations of the apparatus could include additional stages of heat exchangers and gas-sorbent contact chambers or zones. Other configurations could also include gas-sorbent contact chambers or zones with integrated cooling stages to create optimum temperature gradients in the direction of flow. Optimizing temperature gradients would maximize acid gas uptake for a given reactor volume.

A kinetic study was performed to develop this invention and its claims with respect to hydrogen chloride capture; results are presented in Error! Reference source not found.5, Error! Reference source not found.6, and example tables. Error! Reference source not found.5 presents the HCl concentration results in lines of constant residence time as a function of temperature, considering a constant pressure in the sorption chamber or zone (64.7 psi, 4.46 bar absolute). Intra-particle mass transfer resistances may exist in a real system that may shift kinetic results and corresponding optimum temperatures, but the smaller and well dispersed particles—as are produced by the present invention—help to minimize intra-particle resistances. Error! Reference source not found. 6 illustrates the interplay between sorption kinetics that are faster at elevated temperatures and the equilibrium limitation that is more favorable at lower temperature. An optimum temperature can therefore be determined for a given sorbent reactor volume and operating pressure, which will have determined the reactor gas residence time and sorption kinetics of that particular combination.

Error! Reference source not found.6 presents HCl concentration results as isobaric lines for a fixed 63 second residence time in the sorption reactor as a function of temperature. Higher pressures favor a lower potential HCl concentration. In the Error! Reference source not found.6 example, the minimum HCl concentration achieved at 50 psig is 30% less than what is achieved at 0 psig. Note that the optimum (the minimum contaminant) occurs at a slightly higher temperature with increased pressure.

A non-obvious aspect of the present invention is that it specifies feeding granular sorbents (~1000 to 2000 μm particles) into the bubbling fluid bed gasifier in non-activated mineral form (e.g., limestone, dolomite, or other), rather than dry fine and active powder injection to the freeboard.

Another key feature is that pressurized operation is preferable. The many benefits of pressure operation are non-obvious. First, increased pressure enables a lower final chloride concentration at a higher temperature as evidenced in Error! Reference source not found.6. Secondly, variable-pressure operation enables velocity control in the fluid bed to fix the residence time in downstream fixed volume sorbent-gas contacting reactors. Elevated-pressure operation enables the use of pressure set point modulation to control the reactor's superficial velocity at a given gas production rate. The ability to control the velocity with pressure set point modulation also provides opportunity to effect the preferred particle size and elutriation rate that is correlated with superficial velocity in the fluid bed reactor. These features are in contrast with systems described in other publications which are designed to operate at ambient pressure. These systems must vary velocity with gas production capacity and therefore cannot modulate to achieve optimum particle size quality with varied gas production rates. This is especially true when the system employs circulating fluid beds with fixed geometry cyclones that define the sorbent slip rate and the residence time in downstream sorbent contacting vessels and filters cannot be controlled. Those systems therefore have less than ideal sorbent performance with gas production rate turndown.

The fluid bed gasifier generates a gas product in an agitated bed of sand where the majority of the solids mass and temperatures generally exceed 700° C., and thus has an unfavorable equilibrium for chloride uptake. Counter intuitively, feeding powdered sorbent into the fluid bed results in a less effective utilization of the sorbent—a powdered sorbent injected to the fluid bed produces agglomerates that sink and are discharged as oversize solids from the fluid bed media screen. If fine sorbent is fed to the fluid bed it does not provide the opportunity to elutriate the preferred particle size with grinding during activation, as is the case with the present invention, because of a tendency of the powdered feed to form agglomerates. Injecting finely divided dry powders into the freeboard results in poor distribution of the sorbent, which limits its effectiveness. In contrast, feeding larger granular sorbent particles—especially when fed in higher frequency pulses (for example, more than ten injections per hour) will provide regular release through attrition of finely divided particles, highly dispersed and well mixed with the gas, and moreover, heat-activated particles that give the highest sorbent utilization.

Fluid bed reactors are commonly operated at atmospheric pressure in circulating mode (higher velocity by design that is on the order of 10 to 20 times the minimum fluidization velocity and that employs a cyclone for sand recovery), or bubbling mode (lower velocity by design, on the order of 3 to 8 times the minimum fluidization velocity). A fluid bed may also be operated at pressure. The elutriation rate and particle size of char-ash products of gasification and injected granular sorbent will vary with fluid bed velocity. By controlling the fluid bed pressure (by modulating input oxidant flow or by modulating a downstream pressure regulating valve) it is possible to control the fluid bed discharge velocity, and so controlling the sorbent and char-ash particle size is possible to a degree by controlling the fluid bed velocity.

In this invention, a fluid bed reactor is designed to operate at variable pressure to provide for a new degree of freedom—otherwise not available to atmospheric fluid bed gasifiers—for controlling the sorbent and bio-char particle size and release rate by correlating with bubbling fluid bed superficial velocity for production of activated and internally ground particles that were initially fed as larger granular materials. Pressurized operation also reduces the lower limit of concentration (the gas-phase HCl equilibrium mole fraction) that can be achieved compared to atmospheric pressure operation.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

DESCRIPTIONS OF THE PREFERRED EMBODIMENTS

Figure 1:
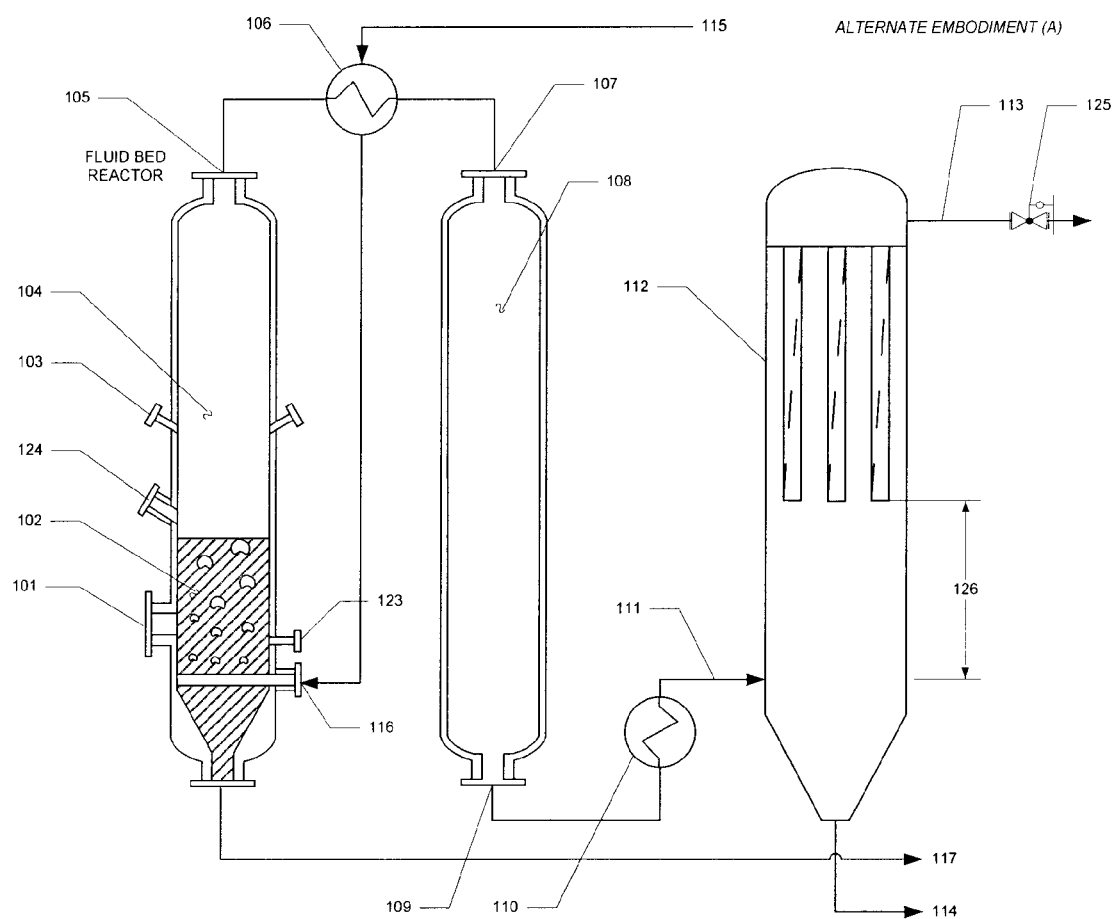
FIG. 1 is a schematic drawing of a first embodiment of the present invention showing the arrangement of a fluid bed, heat exchanger(s), sorption residence time chamber or zone, and bag house.

The basic embodiment of this invention is presented in FIG. 1. The apparatus of this invention is a system that comprises a pressurized bubbling fluid bed reactor (102) that internally converts a raw granular sorbent (101) and biomass materials into activated fine powders useful for acid gas capture in the remainder of the system; raw granular sorbent, biomass, and means for feeding the raw granular sorbent and the biomass into the fluid bed reactor (102) as a blend at (101) or separately feeding sorbent at (123). The system further comprises a primary heat exchanger (106), a sorbent residence time chamber (or zone; throughout this application the term "chamber" may be interchangeable with the word "zone" which implies an area without physical boundaries separating it from the next area) (108), and, preferably, a secondary gas cooler/heat exchanger (110) and a filter zone (112). Said primary heat exchanger (106) cools sorbent and produced gases and provides a preferred sorption temperature. The sorbent residence time chamber or zone (108) provides gas and sorbent contact residence time. The secondary gas cooler (110), when employed, provides for a second preferred sorption temperature for the filter chamber or zone (112); the filter chamber or zone (112) (e.g., baghouse or chamber with rigid filter elements) is preferably designed with an unusually long gas plenum (126), located below the filter elements (or bag filters) that provides for additional gas-sorbent contact residence time.

The sorbent (101) of this invention is generally granular limestone or granular dolomite in combination with internally produced high surface area bio-char or ash materials containing alkali and alkali-earth elements, various transition metal oxides (titanium, iron, and zinc oxides), alumina, and silica, other ash elements, and fixed carbon. Other added sorbents can be alternatively utilized or discovered for use in the same apparatus including zinc oxides, etc., preferably in a non-activated (e.g. preactivated) state. The sorbent (101) must be in its activated state to obtain maximum contaminant uptake which generally requires heating and particle size reduction. The heating and particle size reduction and controlled size release is the result of the use of the bubbling fluidized bed (102) of media (sand) in this invention. It is also beneficial to have the activated sorbent highly mixed and dispersed (not agglomerated) in the gas stream, which is another beneficial utility of feeding a granular sorbent with the fluidized bed reactor employed for sorbent activation.

Alternate configurations of the apparatus could include additional stages of heat exchangers alternating with gas-sorbent contact chambers or zones. Other configurations could also include gas-sorbent contact chambers with integrated cooling stages to create optimum temperature gradients in the direction of flow for the purpose of maximizing contaminant uptake for a given reactor volume.

Figure 2:
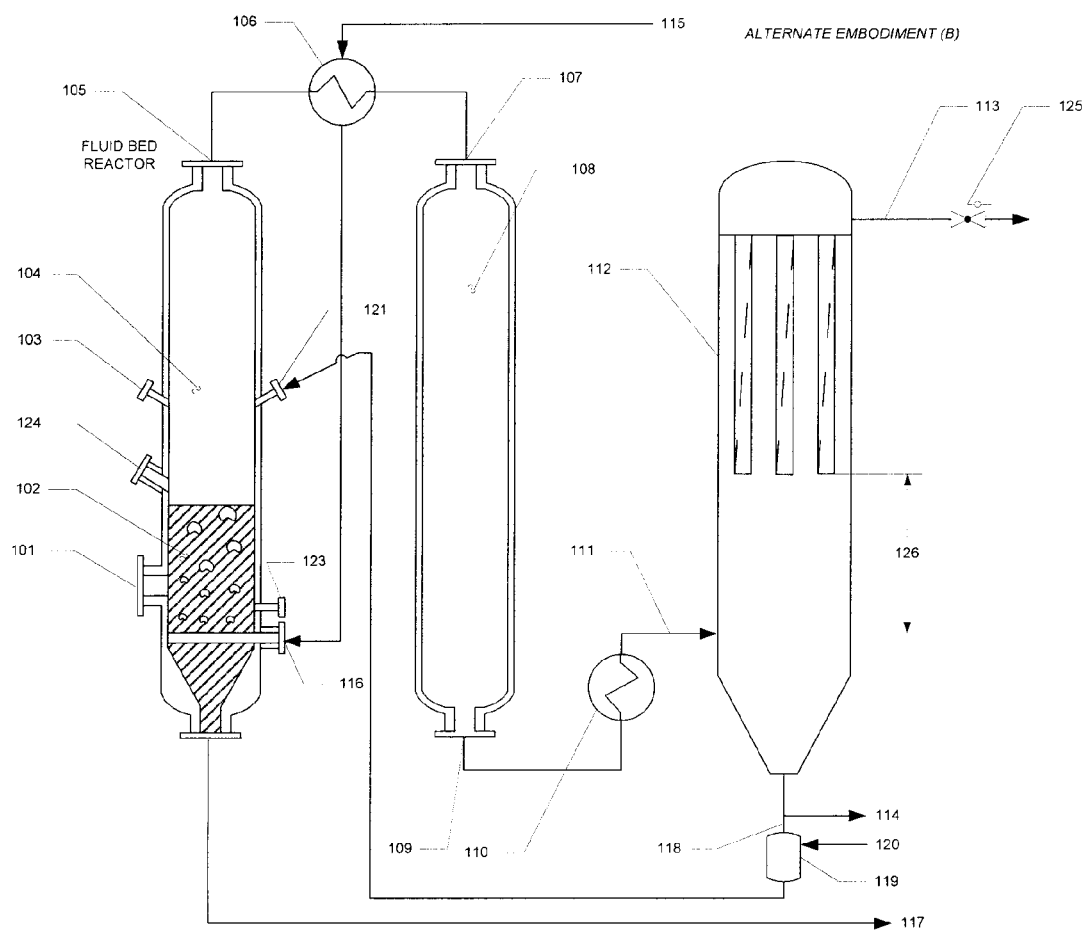
FIG. 2 is a schematic of a second embodiment showing the arrangement of a fluid bed, heat exchanger(s), sorption residence time chamber or zone and bag house along with split stream of the bio-char ash/sorbent mixture to allow recycling to the gasifier freeboard.
Figure 3:
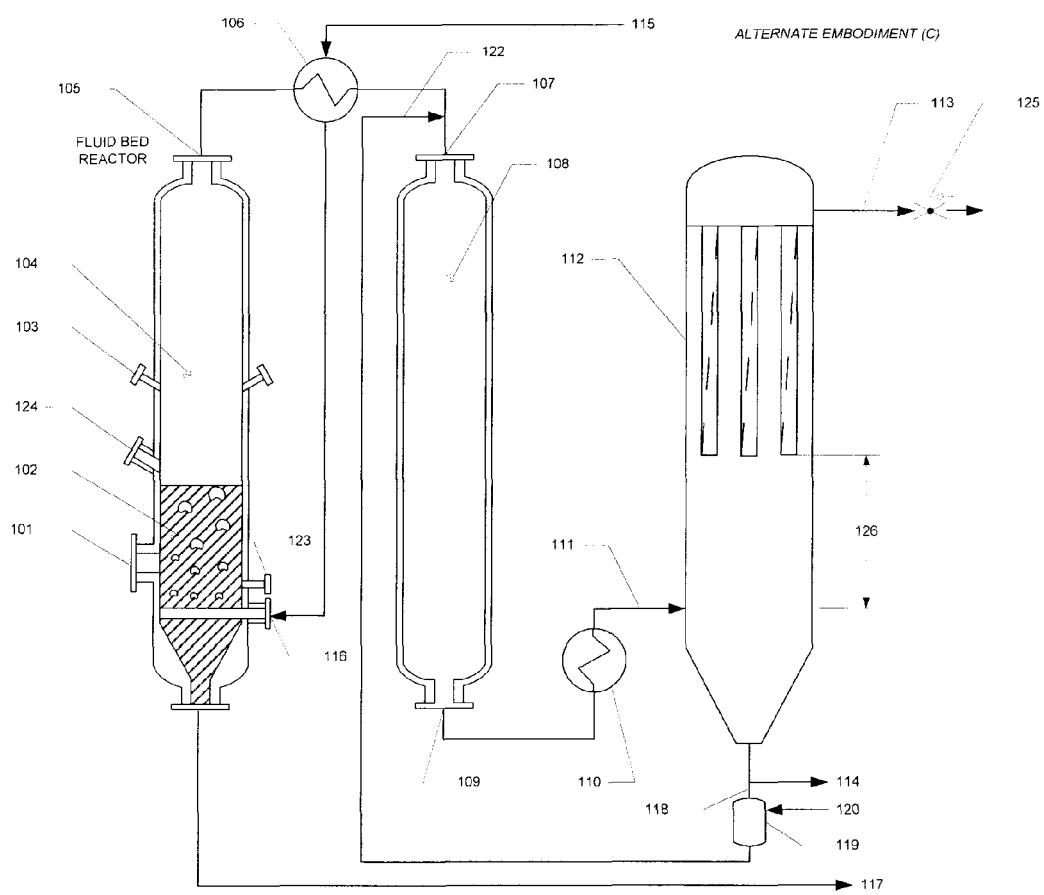
FIG. 3 is a schematic drawing of a third embodiment which is similar to the second but the recycle stream enters just above the sorption residence time chamber or zone.

Optional recycling of sorbent and biochar is contemplated in FIG. 2 and FIG. 3 to improve sorbent utilization. The flow of filter separated solid materials, including partially utilized sorbent and biochar at the bottom of (112) can be split into two streams (114, and 118), the recycled portion being stream (118). Various methods of recycle could be conceived and be obvious, but one method would involve a dense phase transfer chamber or zone (119) that has solids pushed by any convenient gas (e.g., steam nitrogen, air, carbon dioxide, or other gases) (120). The recycled solids may be returned to the freeboard (121) as shown in FIG. 2, or any location upstream of heat exchanger (106), or after heat exchanger (106) as shown in FIG. 3.

Figure 4:
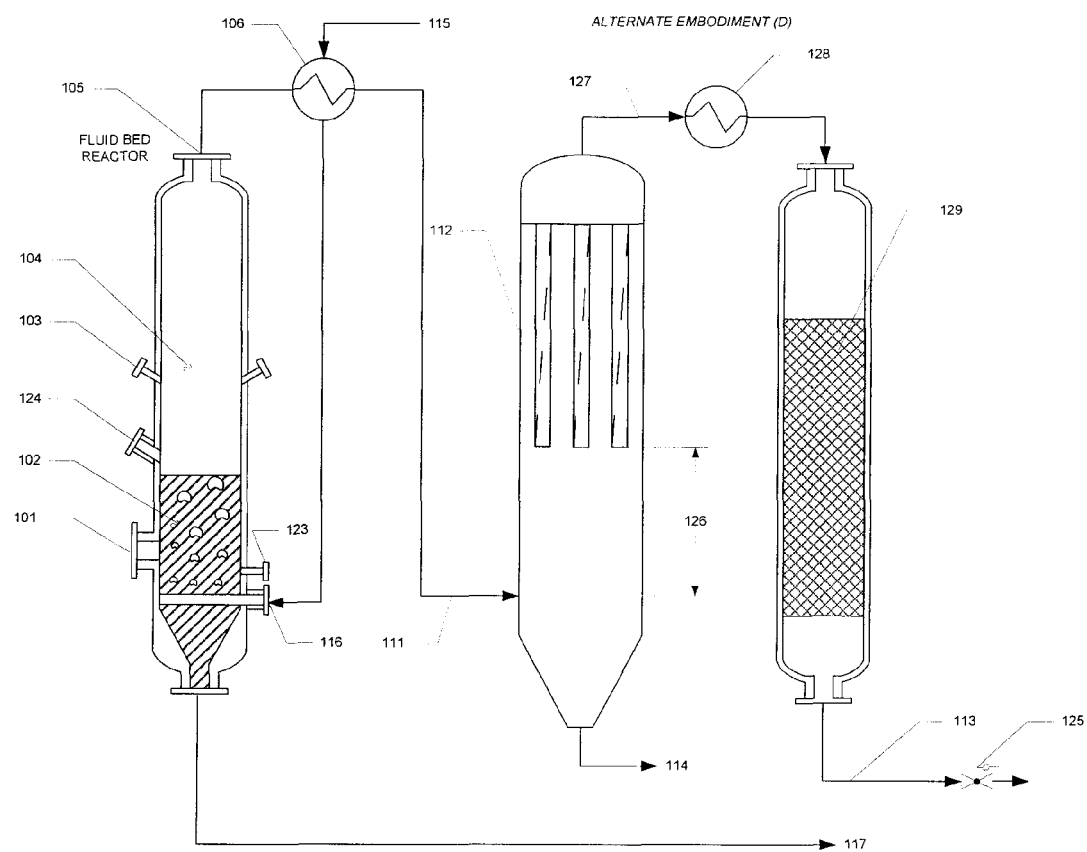
FIG. 4 is a schematic drawing of the invention including alternating staged cooling and resident time chambers or zones wherein the bag house operates as the initial gas-sorbent contact vessel and delivers the cleaned gas to a fixed bed sorbent-gas contacting vessel which may contain a high performance sorbent to address ultra-low trace contaminant or sulfide removal requirements.
Figure 5:
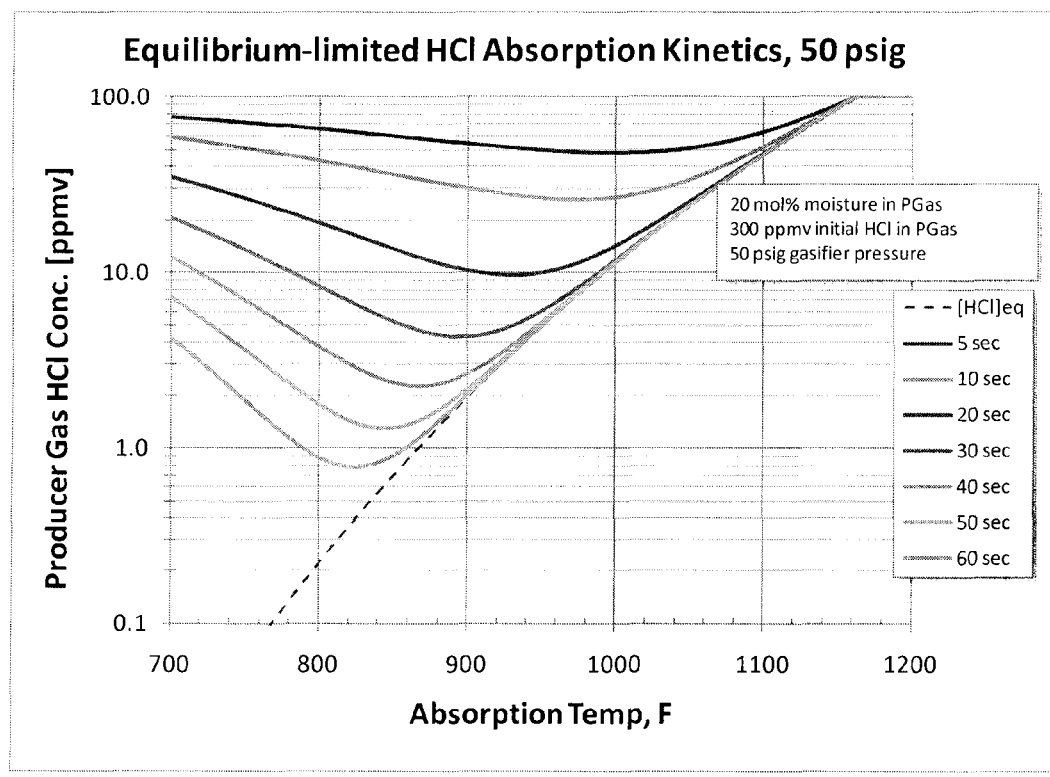
FIG. 5 presents the kinetically determined HCl concentration results in lines of constant residence time as a function of temperature, considering a constant pressure in the sorption chamber or zone.
Figure 6:
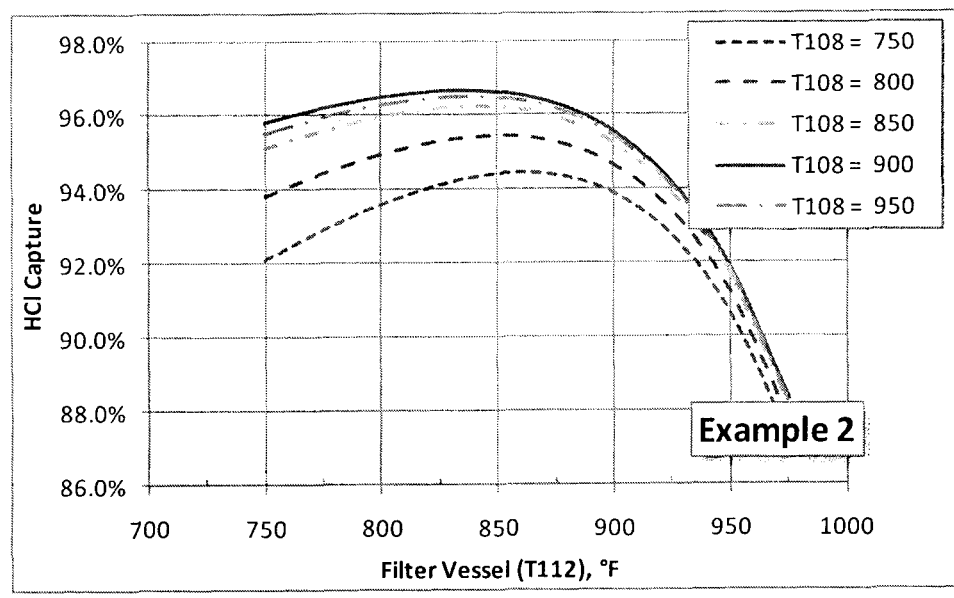
FIG. 6 presents HCl concentration results as isobaric lines for a fixed 63 second residence time in the sorption reactor as a function of temperature.

Optional use of a packed bed sorbent contact vessel after the filter vessel is an alternate configuration of this apparatus, as indicated in FIG. 4, and might actually include pelletized bio-char, provided the pellet's binder material is non-volatile.

The pressurized bubbling fluidized bed reactor (102) provides a combination of benefits to the invention. The pressure operation improves kinetics for acid gas uptake and also provides the mechanism for gasifier velocity (and sorption chamber residence time) control. The bubble agitated fluid bed reactor provides rapid heating for sorbent activation, sorbent grinding (attrition or comminution), and sorbent mixing and dispersion in the gas to be treated. The pressurized gasifier can vary its gas flow while holding constant its superficial velocity (or pressure) and temperature. Since the optimum elutriated sorbent particle size is correlated with velocity, the desired sorbent properties can be achieved by modulating a pressure set point. For example, the preferred pressure set point ($P_{BFB\_SP}$) is related to a desired velocity set point ($V_{BFB\_SP}$) and the current operating pressure ($P_{BFB\_PV}$) and the current superficial velocity ($V_{BFB\_PV}$) (equal to the measured or otherwise known gas volume flow divided by the freeboard cross sectional area) as follows:

$$P_{BFBSP} = \left\{ (P_{BFBPV} + P_{amb}) \left( \frac{V_{BFBPV}}{V_{BFBSP}} \right) - P_{amb} \right\}$$

The pressure modulation to achieve the set point ($P_{BFB\_SP}$) may be executed by various means including downstream valve modulation (back pressure valve) and input flow modulation (increasing or decreasing the blast and/or biofuel flows).

Prior art has disclosed injecting previously ground powdered sorbents into the gas stream as a technique for capturing hydrogen chloride trace contaminants. It seems intuitive to inject powdered sorbents above the dense phase of the fluid bed gasifier, or even to inject the previously ground sorbents into the dense phase of the fluidized bed along with the biomass or refuse derived feedstock to achieve the objective. But in fact, the mixing action of the fluid bed when previously ground sorbents are injected into the dense phase functions actually forms larger lime agglomerates (of which a portion might be removed with the spent sand) instead of producing the desired sorbent particles. Further, the injection of previously ground sorbents into the fluid bed actually does not produce the optimally desired dispersion or particle size for acid gas capture. The present invention instead contemplates injecting sorbent as a granular particle (rather than a powder) which allows the raw sorbent solids (including biomass particles) to have controlled release by attrition as it is activated. Feeding granular particles is preferable because, through the action of the fluid bed, it generates a stream of ideally-sized sorbent particles that are also uniformly dispersed in the produced gas stream. The present invention provides for better lime utilization and better sorbent activation and dispersion by feeding granular particles.

METHOD AND EXAMPLES

The method of the present invention includes operating the fluidized bed reactor (102) to pulverize and activate the granular feedstock (granular non-activated sorbents and biomass). The fluid bed grinds the granular particles while at the same time providing the heat needed to activate the materials for acid gas capture. The fluid bed is operated at a constant superficial velocity, which may be 3 to 10 times the minimum fluidization velocity. Superficial velocity in the dense phase is defined as the volumetric gas flow out of the reactor divided by the cross sectional area of the dense phase fluid bed (102). The preferred superficial velocity is determined based on correlations for particle size and elutriation rates and field verification. An elutriated particle (a particle leaving the dense phase through the freeboard (104)) size is preferably 50 μm or less, and most preferably 20 μm or less. The granular sorbents are preferably added in small bursts at high frequency intervals (usually 6 or more times per hour), preferably approaching a continuous feed, or such that no temperature oscillations are observed in the fluid bed reactor with sorbent input pulses.

The first cooling step provided by the heat exchanger (106) is essential to provide beneficial equilibrium (thermodynamic driving force) for acid gas capture and also to precipitate alkali elements out of the gas phase. These alkali elements may have been associated with the biomass ash rather than any added sorbent. Precipitating the alkali elements out of the gas phase as solids affords its beneficial reaction with acid gases and subsequent removal as a solid. The first heat exchanger (106) is operated to cool the generated gas and sorbent mixture to an optimum temperature (usually about 750 to about 900° F.) for acid gas capture in the gas-sorbent contact chamber or zone (108); and, preferably this temperature is less than required to precipitate alkali oxides and corresponding alkali metal salts (when reacted with acid gases), for example not more than about 1200° F. An optional secondary heat exchanger (110) is operated to achieve an optimum temperature in the standard or modified (extended residence time) filter vessel (112), usually about 700 to about 900° F. but generally a lower temperature than in the gas-sorbent contact chamber (108).

The method of removing unwanted contaminants embodied by the present invention is exemplified by the following:

Example 1

Table 1 provides the pertinent data providing a baseline against which the other examples will be compared. The baseline assumes that a singular sorbent effect is employed. In practice, multiple effects are at play. A bubbling fluid bed gasifier is operated at 1500° F. by feeding an appropriate ratio of air and fuel. Biomass is fed at the rate of 6500 lbs/hr and contains 251.4 ppm chlorine (dry basis). Granular limestone is co-fed at the rate of 1% of the biomass feed, or about 14.5 moles Ca/mol HCl. Gas is generated at the rate of 15,470 lbs/hr wet (2.38 lbs wet gas/lb biomass as fed). The initial HCl concentration is 100.0 ppmv in the freeboard, assuming 100% chlorine release as hydrogen chloride, and assuming there is no uptake of chloride by the biochar ash—even though it is known that biochar ash elements previously described have effective sorbent properties. The desired superficial velocity is 4 ft/second (a target for producing the desired lime and bio-char particle size and elutriation rates). Therefore, the operating pressure set-point is determined to be 15.7 psig, as appropriate for the 6-ft diameter dense phase fluid bed, corresponding to 113.0 ft³/s volumetric gas flow. The produced gas has a molecular weight of 26.3 lbs/lbmol with 20% v/v water vapor. In this example, the baghouse is not unusually tall, i.e., not much excess volume below the filter elements and the volume between the cooler and the filter is minimal.

TABLE 1

(Example 1) 100 ppmv HCl initial; 14.1 ppm HCl final, 20% moisture gas, 2.068 atm (15 psig); 15,470 pph gas.

| Zone | T (° F.) | D (ft) | Length (ft) | Volume (ft³) | Velocity† (ft/s) | Dwell Time (s) | $[HCl]_{EQ}$ (ppmv)‡ | KINETIC RESULTS [HCl] (ppmv) | % Cum. Capture |
|---|---|---|---|---|---|---|---|---|---|
| 104 | 1500° | 6.00 | 20.0 | 565.5 | 4.00 | 5.00 | 1944.0 | 100.0 | 0.0% |
| 108 | 950° | 2.00 | 30.0 | 94.25 | 28.19 | 1.06 | 7.489 | 86.6 | 13.4% |
| 112 | 900° | 10.5 | 20.0 | 1392.5 | 0.986 | 16.30 | 2.959 | 14.1 | 85.9% |

†Superficial velocity; nominal volume flow of gas by cross sectional area.
*Excludes volume of bags/filter elements (144, φ 0.5 × 12 ft long)
‡$[HCl]_{EQ} = \{([H2O]/K_{abs})P/P_0\}^{1/2}$ The optimized temperature set point result for chloride capture in the volumes (104), (108), and (112) and corresponding residence times are defined in Table 1. The equilibrium chloride concentration is 0.3 ppm at 900° F., which indicates a potential for up to 99.7% removal, but kinetic limitations provide a lesser final concentration of 14.1 ppm HCl, or only ~86% reduction. If the temperatures in (108) and (112) are both equal to 800° F., non optimum, then the HCl concentration is ~21 ppm.

Example-2

This next example demonstrates the benefit of the gas-sorption residence time chamber or zone. The diameter of the gas-sorbent contact vessel (108) is modified from 2 ft to 8 ft, and the length retained at 30 ft.

The optimized temperature set point result is presented in Table 2. Trend study for this example is presented in FIG. 7. The optimized case achieves 3.3 ppm HCl (~96.7% removal) with 825° F. in the filter vessel (112) and 900° F. in the intermediate gas-sorbent contact vessel (108). The final concentration is about 33% higher if the temperatures are equivalent in (108) and (112).

The optimized temperature set point result is presented in Table 3. The increased filter vessel volume helps to achieve 1.00 ppm HCl (~99.0% removal) with 825° F. in the filter vessel (112) and 900° F. in the intermediate gas-sorbent contact vessel (108).

Example-4

This fourth and final example demonstrates the benefit of increasing pressure to 102 psig, in the dimensionally equivalent system that was presented in Example-3; but, in this case the biomass feed is increased to 25,000 lbs/hr to maintain superficial velocity in the fluid bed reactor.

TABLE 2

(Example 2) 100 ppmv HCl initial; 3.31 ppm HCl final, 20% moisture gas, 2.068 atm (15 psig); 15,470 pph gas.

| | | | | | | Dwell | | KINETIC RESULTS | |
|---|---|---|---|---|---|---|---|---|---|
| Zone | T (° F.) | D (ft) | Length (ft) | Volume (ft$^3$) | Velocity† (ft/s) | Time (s) | [HCl]$_{EQ}$ (ppmv)‡ | [HCl] (ppmv) | % Cum. Capture |
| 104 | 1500° | 6.00 | 20.0 | 565.5 | 4.00 | 5.00 | 1944.0 | 100.0 | 0.0% |
| 108 | 900° | 8.00 | 30.0 | 1508.0 | 1.70 | 17.66 | 2.959 | 13.9 | 86.1% |
| 112 | 825° | 10.5 | 20.0 | 1392.5 | 0.932 | 17.26 | 0.602 | 3.31 | 96.7% |

†Superficial velocity
*Excludes volume of bags/filter elements (144, ϕ 0.5 × 12 ft long)

Example-3

This third example demonstrates the benefit of added volume in the filter vessel by increasing its height by 17-ft beyond 20 ft (the height typically be used in an apparatus set up as described). This filter height extension could be done as a convenient way to increase sorbent contact residence time in the practice of this invention with or without including the intermediate sorbent contact vessel. The dimensions of the gas-sorbent contact vessel (108) of Example-2 are retained in this third case, i.e., diameter modified to 8 feet, length the same at 30 feet.

TABLE 3

(Example 3) 100 ppmv HCl initial, 1.00 ppm HCl final, 20% moisture gas, 2.068 atm (15 psig); 15,470 pph gas.

| | | | | | | Dwell | | KINETIC RESULTS | |
|---|---|---|---|---|---|---|---|---|---|
| Zone | T (° F.) | D (ft) | Length (ft) | Volume (ft$^3$) | Velocity† (ft/s) | Time (s) | [HCl]$_{EQ}$ (ppmv)‡ | [HCl] (ppmv) | % Cum. Capture |
| 104 | 1500° | 6.00 | 20.0 | 565.5 | 4.00 | 5.00 | 1944.0 | 100.0 | 0.0% |
| 108 | 900° | 8.00 | 30.0 | 1508.0 | 1.70 | 17.66 | 2.959 | 13.9 | 86.1% |
| 112 | 825° | 10.5 | 37.0 | 2864.5 | 0.914 | 36.20 | 0.333 | 1.00 | 99.0% |

†Superficial velocity.
*Excludes volume of bags/filter elements (144, ϕ 0.5 × 12 ft long)

TABLE 4

(Example 3) 100 ppmv HCl initial, 1.00 ppm HCl final,
20% moisture gas, 7.94 atm (102 psig); 59,500 pph gas.

| Zone | T (° F.) | D (ft) | Length (ft) | Volume (ft³) | Velocity† (ft/s) | Dwell Time (s) | $[HCl]_{EQ}$ (ppmv)‡ | KINETIC RESULTS [HCl] (ppmv) | % Cum. Capture |
|---|---|---|---|---|---|---|---|---|---|
| 104 | 1500° | 6.00 | 20.0 | 565.5 | 4.00 | 5.00 | 992.2 | 100.0 | 0.0% |
| 108 | 950° | 8.00 | 30.0 | 1508.0 | 1.66 | 18.12 | 3.701 | 10.4 | 89.6 |
| 112 | 800° | 10.5 | 37.0 | 2864.5 | 0.859 | 38.53 | 0.165 | 0.58 | 99.4% |

†Superficial velocity.

The optimized temperature set point result is presented in Table 4 that achieves <0.6 ppm HCl (>99.4% removal) with 800° F. in the filter vessel (112) and 950° F. in the intermediate gas-sorbent contact vessel (108).

Anecdotally, by increasing the length of (108) and (112) to 40-ft, the kinetically limited chloride level is ~300 ppb (parts per billion).

Thus, the present invention has been described in an illustrative manner. It is to be understood that the terminology that has been used is intended to be in the nature of words of description rather than of limitation.

Many modifications and variations of the present invention are possible in light of the above teachings. Therefore, within the scope of the appended claims, the present invention may be practiced otherwise than as specifically described.

BIBLIOGRAPHY

Huiling, F., Yanxu, L., Chunhu, L., Hanzian, G., and Kechang, X. "The apparent kinetics of H2S removal by zinc oxide in the presence of hydrogen." *Fuel* (81), 2002: 91-96.

Shemwell, B., Levendis, Y. A., and Simons, G. A., "Laboratory study on the high-temperature capture of HCl gas by dry-injection of calcium based sorbents." *Chemosphere* (42), 2001: 758-796.

Yang, C. L., Li, M., and Shaw, H. "Reaction Kinetics of Hydrogen Chloride with Calcium Oxide by Fourier Transform Infrared Spectroscopy." *Ind. Eng. Chem. Res.* (39), 2000: 1898-1902.

REFERENCE NUMERALS

TABLE 5

Legend for acid gas capture using fluid bed
activated sorbents and alternating cooling and gas-sorbent
contact stages with final filtration in a novel filter.

| NUMBER | DESCRIPTION |
|---|---|
| 101 | SOLID FUEL AND SORBENT FEED PORT |
| 102 | DENSE PHASE, BUBBLING FLUID BED |
| 103 | FREEBOARD BLAST INLET (OPTIONAL) |
| 104 | DILUTE PHASE, FREEBOARD |
| 105 | GAS CONDUIT AFTER FLUID BED VESSEL |
| 106 | FIRST GAS COOLER |
| 107 | GAS-SORBENT CONTACT REACTOR INLET |
| 108 | GAS-SORBENT CONTACT REACTOR |
| 109 | GAS-SORBENT CONTACT REACTOR EXIT |
| 110 | SECOND GAS COOLER |
| 111 | GAS CONDUIT TO FILTER VESSEL |
| 112 | FILTER VESSEL |
| 113 | GAS CONDUIT AT FILTER VESSEL DISCHARGE |
| 114 | SPENT BIOCHAR AND SORBENT DISCHARGE |
| 115 | RECUPERATIVE FLUID (OPTIONAL) TO FIRST EXCHANGER |
| 116 | BLAST AND/OR STEAM SUPPLY TO FLUID BED REACTOR |
| 117 | FLUID BED SAND DISCHARGE, AS NEEDED |
| 118 | RECYCLE FRACTION OF BIOCHAR AND SORBENT |
| 119 | PNEUMATIC CONVEYING VESSEL (OPTIONAL) |
| 120 | PNEUMATIC CONVEYING GAS (OPTIONAL) |
| 121 | SORBENT AND BIOCHAR RECYCLE TO FLUID BED |
| 122 | SORBENT AND BIOCHAR RECYCLE AHEAD OF VESSEL (108) |
| 123 | LIMESTONE INJECTION, AUXILIARY (OPTIONAL) |
| 124 | SCREENING AND METERING DEVICE |
| 125 | BACK PRESSURE VALVE, PRESSURE CONTROL OPTION |
| 126 | EXTRA LENGTH IN FILTER VESSEL BELOW ELEMENTS |
| 127 | GAS CONDUIT, POST FILTER |
| 128 | GAS COOLER, POST FILTER |
| 129 | (OPTIONAL) PACKED BED SORBENT CHAMBER |

We claim:

1. A gas conditioning system for controlling trace contaminants in biomass and waste generated gases, said system comprising a pressurized bubbling fluid bed reactor comprising at least one non-activated granular solid sorbent material wherein the non-activated granular solid sorbents are converted into activated sorbents some entrained with gases, said reactor in fluid connection with a gas sorbent contact chamber facilitating requisite residence time contact of said gas and said activated sorbents, said gas sorbent contact chamber further in fluid connection with a filter vessel, said filter vessel comprising a first exit conduit from which a filtered gas stream exits and a second exit conduit from which a portion of a spent sorbent stream exits said system with ash.

2. The system of claim 1 wherein said trace contaminants are selected from the group consisting of acid gases and metals.

3. The system of claim 1 wherein said conversion comprises grinding and activating said non-activated granular solid sorbents.

4. The system of claim 3 wherein said conversion provides appropriate sizing and dispersal of activated sorbents into said generated gas stream.

5. The system of claim 3 wherein said conversion further comprises control of at least one operating condition.

6. The system disclosed in claim 5 wherein control of said at least one operating condition comprises a velocity control operating said system at a generally constant velocity.

7. The system of claim 5 wherein control of said at least one operating condition comprises a velocity control operating said system at a velocity between about 3 to about 6 ft/s, and a pressure control to control sorbent particle size.

8. The system of claim 5 wherein control of said at least one operating condition comprises a velocity control operating said system at a generally constant velocity of about 4 ft/s.

9. The gas conditioning system disclosed in claim 5 wherein said system further comprises at least one cooling stage, a velocity control, and a pressure control, operating said system at a generally constant velocity of about 3 to about 6 ft/s, modulating a pressure set point to control sorbent particle size and dispersion, and alternating said at least one cooling stage with said contact residence time in the gas sorbent contact chamber.

10. The gas conditioning system disclosed in claim 5 wherein controlling said at least one operating condition comprises a velocity control set at a generally constant velocity of about 3 to about 6 ft/s, and means to modulate pressure to achieve a desired sorbent particle size and dispersion, and said system further comprises at least one integrated cooling stage in a single vessel.

11. The system disclosed in claim 1 wherein said filter vessel further comprises a dustless side of a plurality of filter elements.

12. The system disclosed in claim 1 wherein the sorbent comprises a not-previously-activated sorbent activated by heating and ground by the fluid bed.

13. The system disclosed in claim 1 wherein the sorbent comprises any auto-generated sorbent that is a constituent of the biomass feed, wherein said auto-generated sorbent is activated by heating and ground during activation by the fluid bed.

14. The system disclosed in claim 1 wherein said trace contaminants are selected from the group consisting of Hg, As, Cd, Se, and Pb.

15. The system disclosed in claim 1 wherein said trace contaminants are selected from the group consisting of HCl, H2S, and HCN.

16. The gas conditioning system for controlling trace contaminants of claim 1 said second exit conduit fluidly associated with the fluid bed reactor and further comprising a dense phase transfer chamber positioned between said second exit conduit and the fluid bed reactor.

17. The gas conditioning system of claim 16 said dense phase transfer chamber further comprising an entry into which a stream of gas is pushed and an exit through which regenerated sorbent is pushed and returned to said fluidized bed reactor.

18. A gas conditioning system for controlling trace contaminants in biomass and waste generated gases comprising a pressurized bubbling fluid bed reactor, comprising at least one non-activated granular solid sorbent material, for conversion of the non-activated granular solid sorbents into activated sorbents and generation of a gas stream, a primary heat exchanger, a sorbent residence time chamber, and a filter vessel comprising a first exit conduit through which filtered gas exits and a second exit conduit through which spent sorbent and ash exits said system.

19. The gas conditioning system of claim 18 further comprising a secondary heat exchanger to act as a gas cooler, and a filter zone.

* * * * *